(12) United States Patent
Noack et al.

(10) Patent No.: US 12,472,381 B2
(45) Date of Patent: Nov. 18, 2025

(54) FIN FOR COLLIMATING THERAPEUTIC RADIATION

(71) Applicant: Siemens Healthcare GmbH, Erlangen (DE)

(72) Inventors: Olivia Noack, Bayreuth (DE); Sebastian Graebner, Speichersdorf (DE); Georg Walberer, Kastl (DE); Fabian Krieg, Pullenreuth (DE)

(73) Assignee: Siemens Healthineers AG, Forchheim (DE)

( * ) Notice: Subject to any disclaimer, the term of this patent is extended or adjusted under 35 U.S.C. 154(b) by 496 days.

(21) Appl. No.: 17/891,209

(22) Filed: Aug. 19, 2022

(65) Prior Publication Data
US 2023/0063659 A1 Mar. 2, 2023

(30) Foreign Application Priority Data
Aug. 24, 2021 (DE) ...................... 10 2021 209 254.3

(51) Int. Cl.
| | | |
|---|---|---|
| *A61N 5/10* | (2006.01) | |
| *B23C 3/00* | (2006.01) | |
| *B23H 9/00* | (2006.01) | |
| *G21K 1/02* | (2006.01) | |

(52) U.S. Cl.
CPC .............. *A61N 5/1045* (2013.01); *B23C 3/00* (2013.01); *B23H 9/00* (2013.01); *G21K 1/02* (2013.01)

(58) Field of Classification Search
CPC ................................ A61N 5/1045; G21K 1/02
See application file for complete search history.

(56) References Cited

U.S. PATENT DOCUMENTS

| | | | | |
|---|---|---|---|---|
| 4,081,295 A | * | 3/1978 | Vogel ........................ | B22F 3/16 419/49 |
| 4,157,815 A | * | 6/1979 | Saviski .................... | C21B 7/106 266/280 |
| 4,464,596 A | * | 8/1984 | Miller .................... | H02K 1/276 310/156.52 |
| 5,156,321 A | * | 10/1992 | Liburdi ................. | B23K 35/30 228/175 |
| 5,343,048 A | | 8/1994 | Pastyr | |
| 5,420,470 A | * | 5/1995 | Fanning ................. | H02K 44/06 310/260 |
| 6,200,502 B1 | * | 3/2001 | Paatzsch ................. | G02B 6/30 264/1.27 |
| 2002/0068179 A1 | * | 6/2002 | Endisch .................... | B41N 7/00 428/447 |
| 2002/0069592 A1 | * | 6/2002 | Sherman ............. | C09K 3/1445 51/309 |

(Continued)

FOREIGN PATENT DOCUMENTS

| | | |
|---|---|---|
| DE | 4203610 C1 | 8/1993 |
| DE | 10211492 A1 | 10/2003 |

*Primary Examiner* — Blake C Riddick
(74) *Attorney, Agent, or Firm* — Harness, Dickey & Pierce, P.L.C.

(57) ABSTRACT

One or more example embodiments of the present invention relates to a fin for collimating therapeutic radiation. The fin comprises a collimation area made of a first material and a holding area made of a second material. Herein, the collimation area and the holding area are pressed together. Herein, the first material is formed to collimate therapeutic radiation. Herein, the holding area can be coupled to an adjustment device for adjusting the fin.

19 Claims, 5 Drawing Sheets

(56) References Cited

U.S. PATENT DOCUMENTS

| | | | |
|---|---|---|---|
| 2005/0017055 A1* | 1/2005 | Kurz | B32B 15/18 |
| | | | 429/510 |
| 2005/0185766 A1 | 8/2005 | Tsujita | |
| 2006/0149386 A1* | 7/2006 | Clarke | A61F 2/32 |
| | | | 623/18.12 |
| 2007/0025519 A1* | 2/2007 | Vogtmeier | G21K 1/02 |
| | | | 378/149 |
| 2007/0127624 A1 | 6/2007 | Seeber et al. | |
| 2007/0250158 A1* | 10/2007 | Krivoruchko | A61L 31/082 |
| | | | 623/1.44 |
| 2011/0129069 A1* | 6/2011 | Freund | G21K 1/025 |
| | | | 378/147 |
| 2011/0182682 A1* | 7/2011 | Abukawa | C04B 35/80 |
| | | | 407/119 |
| 2013/0299347 A1* | 11/2013 | Rozak | C23C 24/04 |
| | | | 204/298.13 |
| 2015/0316359 A1* | 11/2015 | Hales | F42B 1/02 |
| | | | 102/476 |
| 2016/0288200 A1* | 10/2016 | Xu | B22F 3/002 |
| 2017/0148536 A1 | 5/2017 | Kawrykow et al. | |
| 2018/0136164 A1* | 5/2018 | Lee | G01N 27/44756 |
| 2019/0160588 A1* | 5/2019 | Roth | B23K 20/1205 |
| 2019/0226476 A1* | 7/2019 | Stark | F04B 53/1087 |

\* cited by examiner

FIN FOR COLLIMATING THERAPEUTIC RADIATION

CROSS-REFERENCE TO RELATED APPLICATION(S)

The present application claims priority under 35 U.S.C. § 119 to German Patent Application No. 102021209254.3, filed Aug. 24, 2021, the entire contents of which are incorporated herein by reference.

FIELD

One or more example embodiments of the present invention relates to a fin for collimating therapeutic radiation. One or more example embodiments of the present invention further relates to a collimator and a method for manufacturing a fin for collimating therapeutic radiation.

BACKGROUND

It is known to perform radiotherapy, for example, to treat a tumor or also to treat a benign disease such as, for example, heel spurs, tennis elbow, shoulder pain, arthrosis of the various joints or vertebral hemangiomas. Herein, therapeutic radiation is emitted onto a treatment area of an examination object, for example the tumor or the affected limbs. Herein, therapeutic radiation can in particular be high-energy electromagnetic radiation, in particular X-radiation, generated with a linear accelerator. Alternatively, therapeutic radiation can be particle radiation, in particular proton radiation or heavy ion radiation or alpha radiation etc.

Herein, an area that can be irradiated is delimited by a radiation field of the therapeutic radiation. In order to protect surrounding tissue and/or organs of the examination object within the radiation field but outside the treatment area from therapeutic radiation, therapeutic radiation is collimated during radiotherapy. For this purpose, a plurality of fins is typically arranged or aligned in the radiation field between a source of the therapeutic radiation and the examination object such that only the treatment area to be irradiated in the radiation field is not covered by any of the fins. Herein, one of the plurality of fins is formed to attenuate or absorb the therapeutic radiation to such an extent that radiation exposure or the intensity of therapeutic radiation behind the fin is negligibly low. Herein, "behind" describes the arrangement as seen from the source of the therapeutic radiation. In particular, the examination object is arranged "behind" the fin. Thus, in particular, the area of the fin positioned in the radiation field of the therapeutic radiation, hereinafter referred to as the collimation area, must be made of a material that attenuates the therapeutic radiation. For this purpose, the fin typically consists of tungsten or a compound comprising tungsten or tungsten compound.

In order to be able to arrange or adjust the fin precisely, the fin typically comprises a holding area with which the fin can be coupled to an adjustment device. Herein, the adjustment device is formed to arrange or adjust the fin, and thus in particular the collimation area, precisely in the radiation field.

In order to ensure sufficient precision when adjusting or positioning or arranging the fin and sufficient coverage of healthy tissue and/or organs of the examination object, in some applications, the fins have to be produced to an accuracy of 5 µm. In particular, in some applications, the fins have to be produced to an accuracy of 0.2 µm. This is typically achieved by cutting out the fin from a block by means of wire erosion. Herein, a fin is typically 2-3 mm thick. The thickness of the fin describes the extension of the fin in a direction perpendicular to the beam direction of the therapeutic radiation. The extension of the fin perpendicular to the thickness and parallel to the beam direction is described by the height of the fin.

Due to its properties, tungsten is difficult to join to other materials. In particular, tungsten has a lower coefficient of thermal expansion or thermal coefficient than steel or copper, for example. In order to prevent the introduction of heat, for example due to wire erosion of the fin, from causing stresses in the fin, the fin is typically made of one single material, the material of the collimation area, in particular tungsten or a tungsten compound.

US 2017/0148536 A1 describes a fin with which the holding area of the fin comprises a frame around the collimation area in which a tungsten plate is enclosed. For this purpose, the individual parts, the holding area including the frame and the tungsten plate, must first be produced individually and then joined. Joining at the end of the manufacturing of the fin does not allow the above-described requirements for accuracy to be met. Reworking is not possible in this case.

SUMMARY

Typically both the collimation area and the holding area of the fin are made of the same material, in particular tungsten or a tungsten compound. However, it is not necessary also to produce the holding area from tungsten or a tungsten compound, since the holding area is not arranged in the beam path and does not have to be formed to attenuate therapeutic radiation. Since tungsten is a very expensive material, there is great interest in producing only the collimation area from tungsten or a tungsten compound.

According to one or more example embodiments, a fin with a holding area is made of a different material than the collimation area, wherein the aforementioned requirements for accuracy can be met.

According to an example embodiment, fin for collimating therapeutic radiation includes a collimation area including a first material; and a holding area including a second material, wherein the collimation area and the holding area are pressed together, the first material is configured to collimate therapeutic radiation, and the holding area is couplable to an adjustment device for adjusting the fin.

According to an example embodiment, the first material and the second material are paramagnetic.

According to an example embodiment, the first material is tungsten or a compound comprising tungsten.

According to an example embodiment, the second material comprises at least one of: a copper-nickel compound, brass, titanium, steel, stainless steel, bronze, or an aluminum alloy.

According to an example embodiment, the first material and the second material are hot isostatically pressed together.

According to an example embodiment, a sintered material is between the first material and the second material, and the sintered material is configured to form a connection between the first and second material during hot isostatic pressing.

According to an example embodiment, the sintered material is formed from nickel or nickel-tungsten.

According to an example embodiment, the first material and the second material are pressed together via a positive fit.

According to an example embodiment, the positive fit is formed as a peg or as a hammer.

According to an example embodiment, the fin further includes a guide element, wherein the guide element is formed by the first and second material.

According to an example embodiment, a collimator includes a plurality of fins, each of the plurality of fins including, a collimation area including a first material; and a holding area including a second material, wherein the collimation area and the holding area are pressed together, the first material is configured to collimate therapeutic radiation, and the holding area is couplable to an adjustment device for adjusting the fin; and the adjustment device, wherein the respective holding areas of the fins are coupled to the adjustment device, and the adjustment device is configured to adjust each fin of the plurality of fins perpendicular to a contact surface of the holding area and the collimation area.

According to an example embodiment, a method for manufacturing a fin according to one or more example embodiments includes pressing together a first block made of the first material and a second block made of the second material to form a combination block.

According to an example embodiment, the method further includes cutting out the fin from the combination block by wire erosion.

According to an example embodiment, the method further includes milling out at least one side surface of the fin from the combination block.

According to an example embodiment, the pressing together of the first block and the second block is performed hot isostatically, and the method further comprises applying a sintered material in powder form to a contact surface of the first block and the second block.

According to an example embodiment, the pressing together takes place via a positive fit between the first block and the second block, the method further comprising cutting out a positive form of the positive fit from a contact surface of the first block; and cutting out a negative form of the positive fit from a contact surface of the second block.

According to an example embodiment, the method further includes at least one of (i) milling out at least one guide element from the combination block, or (ii) milling out a contour of the holding area from the combination block.

BRIEF DESCRIPTION OF THE DRAWINGS

Properties, features and advantages of one or more example embodiments of the present invention will become clear and more plainly comprehensible in conjunction with the following figures and the description thereof. Herein, the figures and descriptions are not intended to limit the present invention and its embodiments in any way.

In different figures, the same components are given the same reference symbols. The figures are not generally true to scale.

In the figures:

Figure 1:
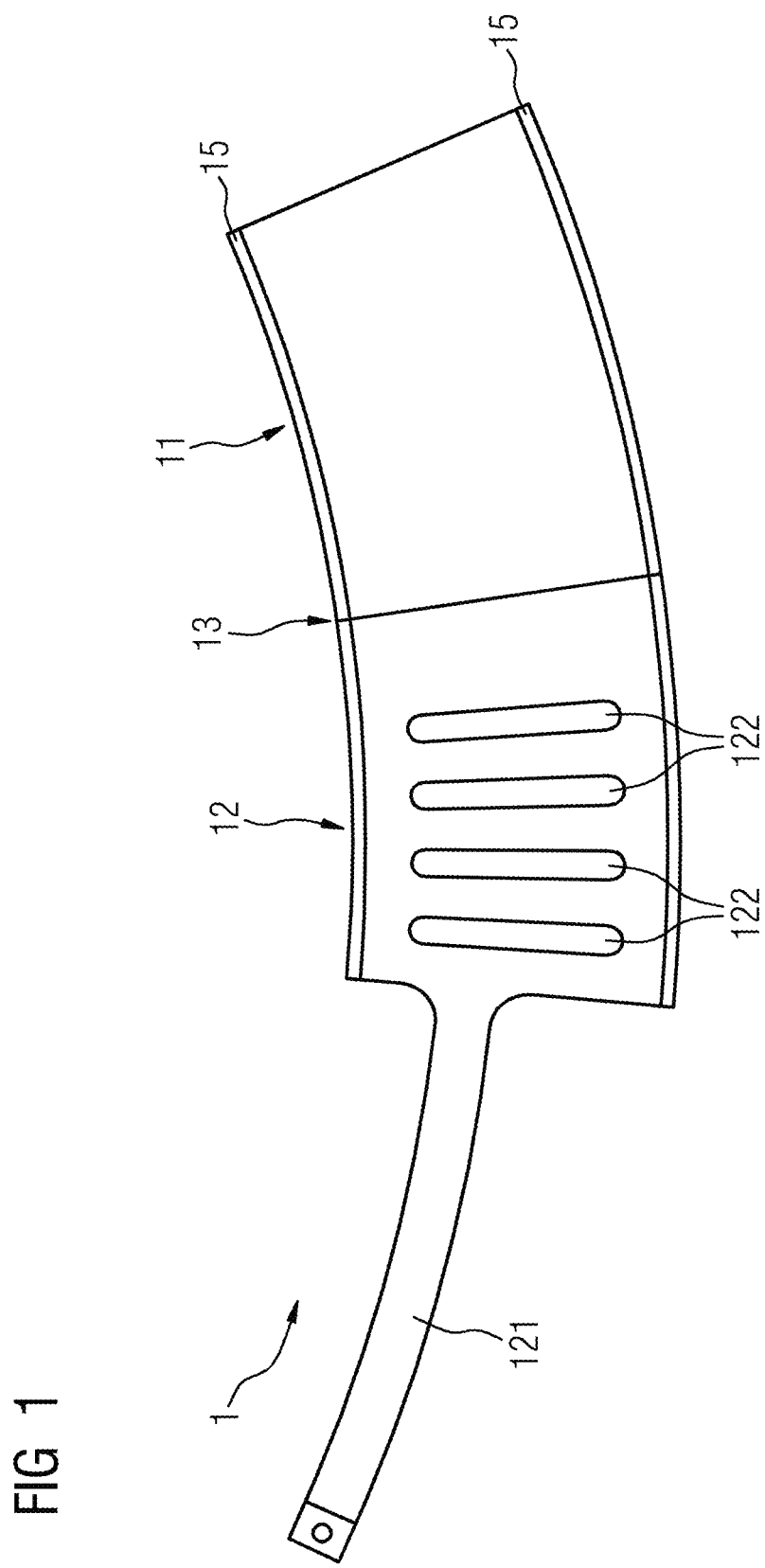
Figure 2:
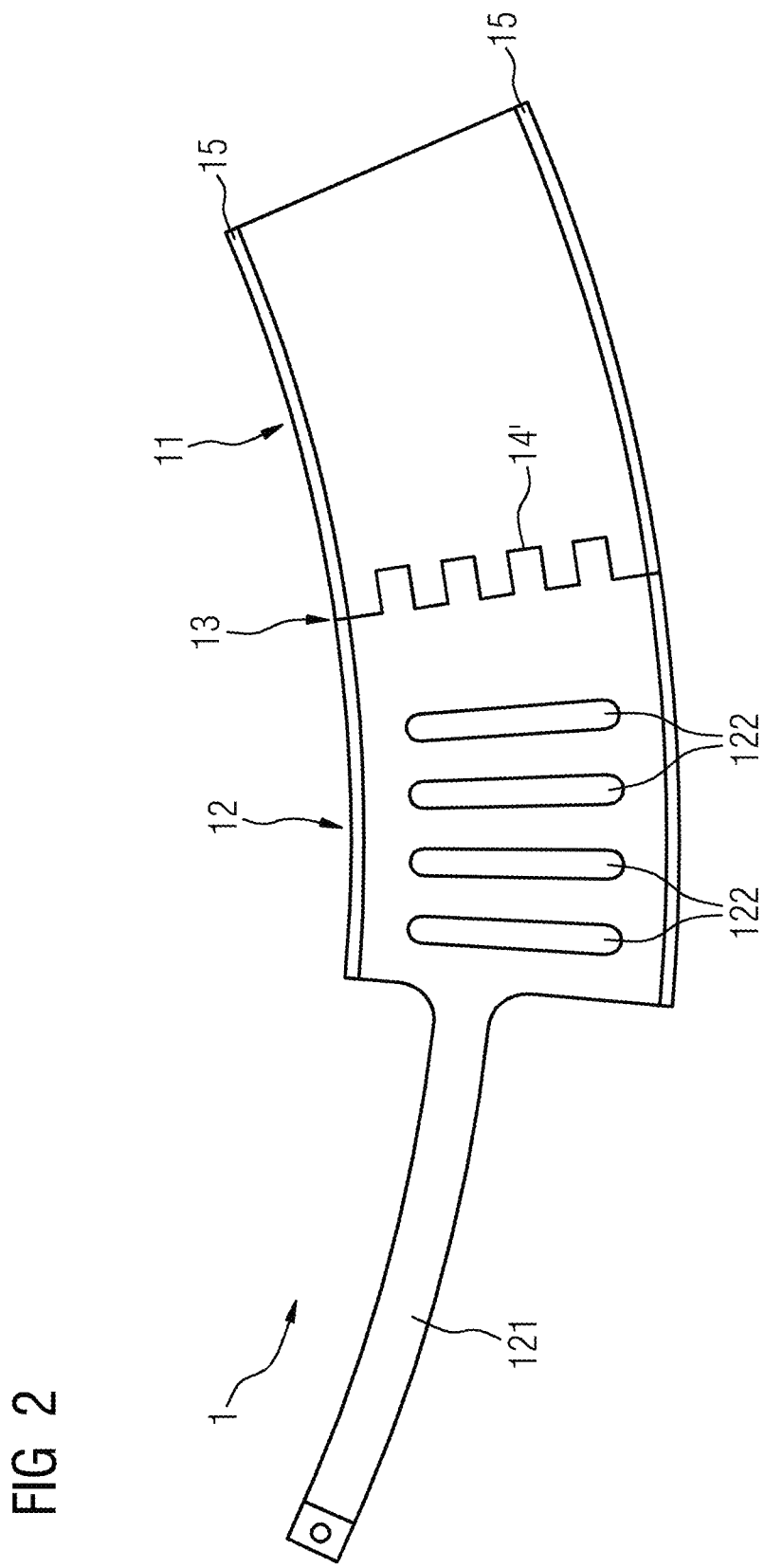
Figure 3:
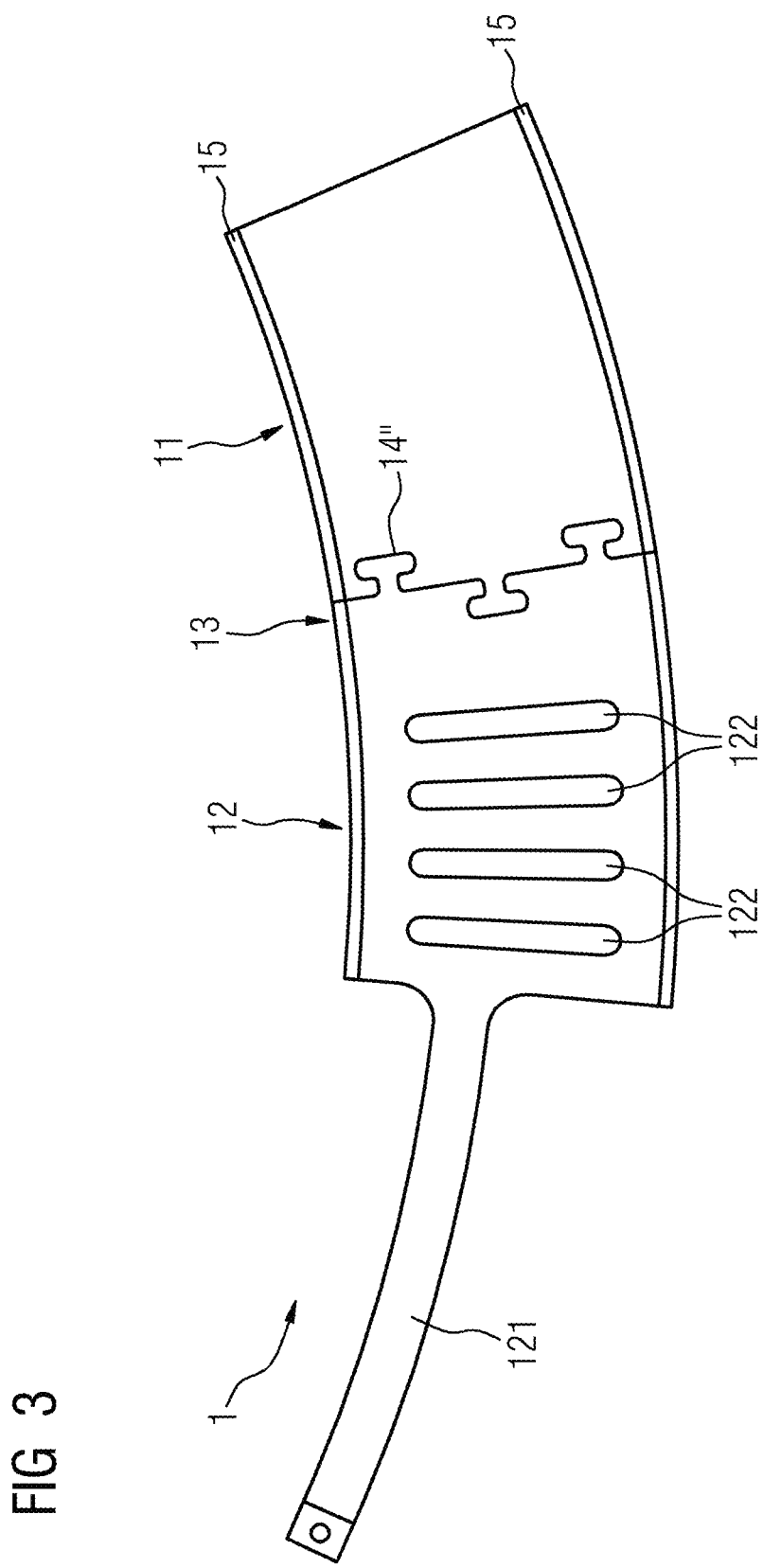
Figure 4:
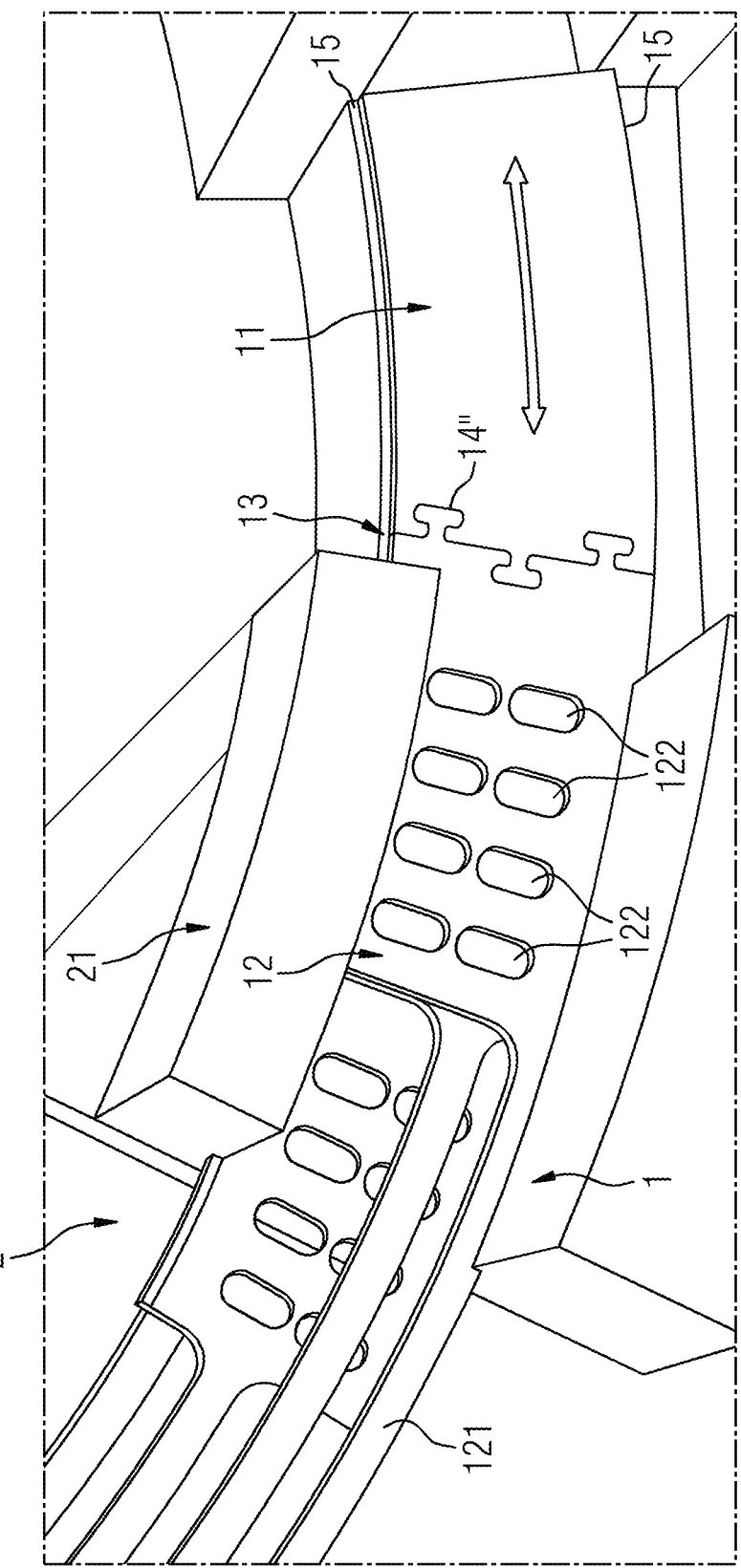
Figure 5:
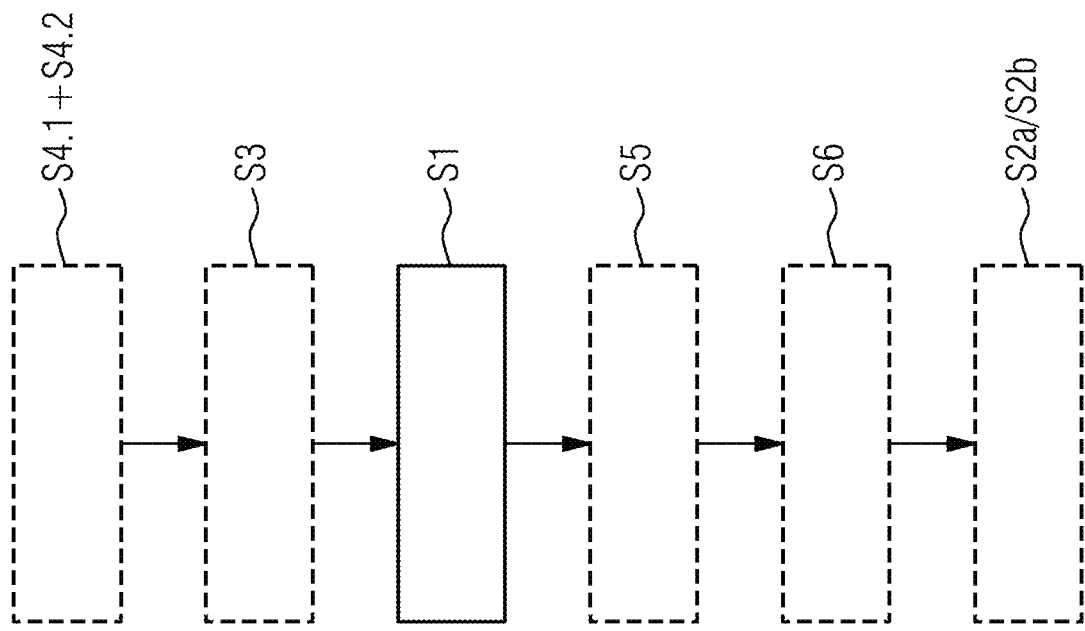

FIG. 1 shows a first exemplary embodiment of a fin for collimating therapeutic radiation, FIG. 2 shows a second exemplary embodiment of a fin for collimating therapeutic radiation, FIG. 3 shows a third exemplary embodiment of a fin for collimating therapeutic radiation, FIG. 4 shows an exemplary embodiment of a collimator, and FIG. 5 shows an exemplary embodiment of a method for manufacturing a fin for collimating therapeutic radiation.

DETAILED DESCRIPTION

The following describes one or more example embodiments both with respect to the claimed apparatuses and with respect to the claimed method. Features, advantages or alternative embodiments mentioned in this regard are equally applicable to the other claimed subject matter and vice versa. In other words, the physical claims (which are, for example, directed at an apparatus) can also be developed with the features described or claimed in connection with a method. Herein, the corresponding functional features of the method are formed by corresponding physical modules.

One or more example embodiments of the present invention relates to a fin for collimating therapeutic radiation. The fin comprises a collimation area made of a first material and a holding area made of a second material. Herein, the collimation area and the holding area are pressed together. Herein, the first material is formed to collimate therapeutic radiation. Herein, the holding area can be coupled to an adjustment device for adjusting the fin.

In a particularly preferred embodiment of the present invention, the therapeutic radiation is X-radiation. X-radiation describes electromagnetic radiation with an energy of more than 100 eV. X-radiation can in particular be collimated for radiotherapy. In radiotherapy, a treatment area of an examination object is irradiated with ultra-hard or ultra-high-energy X-radiation (>1 MeV). In particular, the treatment area can be irradiated with X-radiation with an energy greater than or equal to 6 MeV.

In an alternative embodiment, the therapeutic radiation for radiotherapy can be particle radiation, in particular proton radiation or heavy ion radiation or alpha radiation etc.

In radiotherapy, it is, for example, possible to treat tumors or heel spurs, tennis elbow, shoulder pain, arthrosis of the various joints, vertebral hemangiomas etc. by irradiation with therapeutic radiation. For this purpose, the examination object, in particular a patient, is positioned in a radiation field of the therapeutic radiation. Herein, the examination object can in particular be a human or an animal. Herein, the examination object is positioned in such a way that an area to be treated or treatment area is arranged in the radiation field. The radiation field describes an area that can be irradiated with therapeutic radiation in a plane perpendicular to a direction of propagation of the therapeutic radiation. In particular, the radiation field describes an area that can be irradiated on the examination object or in a plane of the examination object. Herein, the radiation field is limited by the propagation of the therapeutic radiation. The propagation of the therapeutic radiation is described by a beam path. A projection of the beam path onto the plane of the examination object can describe the radiation field. Herein, the therapeutic radiation is emitted from a source. If the therapeutic radiation is X-radiation, the source is an X-ray source. The X-ray source can in particular be a linear accelerator.

The fin is formed to collimate therapeutic radiation. In particular, therapeutic radiation can be collimated with more than one fin. For this purpose, the fin is arranged between the examination object and the source. Collimation of the therapeutic radiation forms the radiation field with the fin such that tissue adjacent to the treatment area and/or organs positioned within the radiation field are shielded from the therapeutic radiation by the fin. In other words, an irradiated area on the examination object can be formed by arranging or positioning the fin in the beam path. In other words, the radiation field is restricted to the irradiated area by the at least one fin. In particular, the radiation field is restricted such that the area actually irradiated corresponds to the treatment area. This step is referred to as "collimation".

During collimation of therapeutic radiation by the fin, the intensity of the therapeutic radiation is attenuated on penetration of the fin such that the intensity of the therapeutic radiation behind the fin is negligibly low. IEC 60601-2-1 (2016) specifies standards for electron accelerators in the range of 1 MeV to 50 MeV. In particular, paragraph 201.10.1.2.103.2.1 a specifies that the intensity of X-radiation behind a fin should be at most 2% of the input intensity. In some embodiments of the present invention, the fin can be formed such that the intensity of X-radiation behind the fin is attenuated to at most 1% of the input intensity.

Herein, "behind" the fin refers to the view of the fin from the position of the source. Herein, the fin is arranged in such a way that the therapeutic radiation penetrates the fin at least in part of the collimation area. For this purpose, the collimation area of the fin is extended in the beam direction or direction of propagation of the therapeutic radiation. In particular, hereinafter, the extension of the fin in the beam direction is referred to as the "height" of the fin. In particular, the collimation area in the beam direction can have an extension of between 5 cm and 8 cm. In particular, the extension of the fin in the beam direction can be 5 cm, 5.5 cm, 6 cm, 6.5 cm, 7 cm, 7.5 cm or 8 cm. The collimation area of the fin is thus formed to be arranged at least partially in the beam path of the therapeutic radiation.

Perpendicular to the height and hence perpendicular to the beam path, the fin can have an extension of between 0.5 mm and 1 cm. In particular, the fin can have an extension of between 1 mm and 5 mm perpendicular to the height and perpendicular to the beam path. Hereinafter, this extension is referred to as the "thickness" of the fin. In particular, the fin can be between 2 mm and 3 mm thick.

The holding area is formed to be coupled to an adjustment device. Herein, the holding area and the collimation area are connected to one another, in particular pressed together. Adjusting the holding area with the adjustment device enables the collimation area to be adjusted or arranged or positioned in the beam path to restrict the radiation field.

Herein, the collimation area is made of the first material and the holding area is made of the second material. Herein, the first material and the second material are different from one another. Herein, the collimation area and the holding area are pressed together. In other words, the fin comprises a pressing point at which the collimation area and the holding area are connected to one another. In other words, the fin comprises a pressing point between the collimation area and the holding area. In other words, a contact surface of the holding area is connected to or pressed on a contact surface of the collimation area at the pressing point.

The pressing point is in particular formed in such a way that a stable connection between the first and second material can be ensured. In particular, the pressing point is formed in such a way that no internal stress or stress occurs within the fin at the pressing point of the first and second material or that such stress is minimal. In particular, the pressing point is formed in such a way that heat input into the fin, for example by wire erosion, leads to no or only low (internal) stress between the first and second material at the pressing point. In particular, the pressing point is formed to compensate stresses caused by different coefficients of (thermal) expansion of the first and second material. Alternatively or additionally, the pressing point is formed as heat-resistant. In particular, the pressing point is formed in such a way that it can withstand short-term temperatures of more than 1000° C. during wire erosion. Alternatively or additionally, the pressing point is formed to withstand an application of force of up to 30 N/mm2 during milling or milling-out of the fin. In particular, the pressing point can be formed in such a way that it withstands an application of force of up to 50 N/mm2.

Herein, the first and/or second material meet at least one of the following criteria: radiation resistance (in particular up to approximately 250 kGy), operating temperature at least between 15 and 50° C., suitability for wire erosion (in particular resistivity of less than 100 Ωcm), hardness of at least 50 HV (in particular at least 70 HV, in particular at least 75 HV), machinability, high corrosion resistance. In particular, the first and/or second material can meet all these criteria.

The inventors have recognized that the use of different materials for the holding area and the collimation area enables the material costs of the fin to be minimized. In particular, the inventors have recognized that the requirements for the second material with respect to attenuation of therapeutic radiation are lower than they are for the first material. In particular, the inventors have recognized that thus a more cost-effective material can be selected for the holding area as the second material. The inventors have also recognized that the second material can be lighter than the first material. In this way, the weight of the fin can be reduced. This can in particular make the fin easier to handle. The inventors have recognized that the pressing together enables a stress-free or low-stress connection to be formed at the pressing point, even if the first and second material have different coefficients of thermal expansion. The inventors have recognized that wire erosion for cutting out the fin after the pressing together is also possible. In other words, the pressing point is formed in such a way that no stresses, or only very low stresses occur at the pressing point as a result of the wire erosion for cutting out the fin. The inventors have recognized that a fin formed in this way is in particular suitable for collimating therapeutic radiation in the form of X-radiation.

According to one or more example embodiments of the present invention, the first and second material are paramagnetic.

In other words, the first and second material are not magnetizable. In particular, the magnetic permeability of the first and second material is less than 1.05 μ0. Herein, μ0 describes permeability in a vacuum. In other words, "paramagnetic" means that the first and second material have a permeability of less than 1.05 μ0.

The inventors have recognized that the use of paramagnetic materials also enables the fin to be used in a magnetic resonance tomography (MRT, also magnetic resonance imaging MRI) system. In particular, this enables radiotherapy to be given under MRT monitoring.

According to one or more example embodiments of the present invention, the first material is tungsten or a compound comprising tungsten.

Hereinafter, a compound comprising tungsten is also referred to as a tungsten compound. Herein, the tungsten compound advantageously comprises a tungsten content of at least 90%. In particular, the tungsten compound can comprise a tungsten content of at least 95%.

In particular, the tungsten compound can also comprise nickel. In particular, a copper-nickel compound can form a "binder" or a "matrix" in the tungsten compound. Alternatively, an iron-nickel compound can form the binder or the matrix if the fin does not have to be paramagnetic.

The inventors have recognized that tungsten is suitable for sufficiently attenuating, in particular collimating, therapeutic radiation, in particular X-radiation, in radiotherapy with a reasonable spatial extension, in particular reasonable height, of the collimation area. The inventors have recognized that, in order to collimate therapeutic radiation, at least the first material must be formed such that the therapeutic radiation is attenuated on penetration of the first material. The inventors have recognized that a binder made of copper-nickel can meet the paramagnetic requirements for the fin in an MRT.

According to one or more example embodiments of the present invention, the second material comprises at least one of the following materials: a copper-nickel compound, brass, titanium, steel, stainless steel, bronze, an aluminum alloy.

In particular, the second material can be more cost-effective than the first material. In particular, the second material is formed to be pressed together with the first material. In particular, the second material can be machinable. In particular, the second material is corrosion-resistant. In particular, the second material can have a hardness of at least 50 HV, in particular at least 70 HV, in particular at least 75 HV.

The inventors have recognized that the second material does not have to meet any special requirements with regard to absorbency of therapeutic radiation, in particular X-radiation. The inventors have recognized that the use of a more cost-effective second material enables the fin to be manufactured in a more cost-effective way. The inventors have recognized that in particular a copper compound, such as a copper-nickel compound or brass, meets the requirements with regard to hardness and costs. The inventors have recognized that pure copper is too soft. The inventors have recognized that titanium and stainless steel also meet the mechanical requirements for the second material. The inventors have recognized that it is easier to machine the second material than the first material, since the second material can in particular be less hard than the first material. The inventors have recognized that thus it is possible to accelerate and simplify a manufacturing process for the fin. The inventors have recognized that milling of the holding area made of the second material is simpler compared to a holding area made with the first material. The inventors have also recognized that the use of one of said materials as a second material can reduce the weight of the fin compared to a fin consisting entirely of tungsten or a tungsten compound. In this way, in particular handling can be improved.

According to one or more example embodiments of the present invention, the first and second material are hot isostatically pressed together.

In particular, the pressing point is formed by hot isostatic pressing. In other words, the first and second material are connected to one another by hot isostatic pressing.

In hot isostatic pressing (HIP), the first and second material are pressed together at a temperature of up to 2000° C. and a pressure of between 100 MPa and 200 MPa. In particular, the first and second material are pressed together at a temperature of between 900° C. and 1200° C. In particular, hot isostatic pressing can take place under a protective gas. The protective gas can, for example, be argon.

The inventors have recognized that hot isostatic pressing enables a stable pressing point to be formed between the first and second material, i.e., in particular between the holding area and the collimation area. The inventors have recognized that the pressing point established in this way meets the requirements for wire erosion (resistance at temperatures above 1000° C.) and milling (resistance with an application of force of up to 30 N/mm2, in some embodiments with an application of force of up to 50 N/mm2). The inventors have recognized that the pressing point established with hot isostatic pressing can compensate (internal) stresses that may occur due to thermal coefficients or coefficients of (thermal) expansion of the first and second material.

According to one or more example embodiments of the present invention, a sintered material is arranged between the first and second material. Herein, the sintered material is formed to form a connection between the first and second material during hot isostatic pressing.

In particular, the sintered material is a third material. In particular, the third material can be a material composition, for example a compound, alloy, mixture, lamination etc. In particular, the connection between the first and second material at the pressing point is formed by the sintered material.

In particular, the sintered material is formed to compensate a difference between the coefficients of thermal expansion of the first and second material. In particular, the sintered material is formed to compensates stresses or internal stresses between the first and second material.

The sintered material can form a layer thickness, in particular between 10 mm and 30 mm, between the first and second material.

In some embodiments of the present invention, the sintered material can be a lamination of different materials, in particular two materials. These materials can form a cascade of coefficients of thermal expansion. In particular, the materials can be formed in such a way that their coefficients of thermal expansion form a fine-stepped transition between the coefficient of thermal expansion of the first material and the coefficient of thermal expansion of the second material.

The inventors have recognized that the sintered material can act as a "bridge" between the first and second material. In other words, the inventors have recognized that the sintered material can act as a stress compensator or a compensator of the coefficients of thermal expansion between the first and second material. The inventors have also recognized that the connection between the first and second material can in particular be formed by a further third material, the sintered material, during hot isostatic pressing. The inventors have recognized that the sintered material can be formed as a type of "adhesive" between the first and second material.

According to one or more example embodiments of the present invention, the sintered material is formed from nickel or nickel-tungsten.

In other words, the sintered material comprises nickel or a nickel-tungsten compound.

The inventors have recognized that the sintered material bonds particularly well with a material if both materials at least partially comprise the same elements. The inventors have recognized that the sintered material advantageously comprises nickel if the binder of the first material comprises nickel. In particular, the binder can then be copper-nickel or iron-nickel. The inventors have recognized that even if the sintered material comprises tungsten as does the first material, a particularly stable connection is formed between the first material and the sintered material during hot isostatic pressing.

According to one or more example embodiments of the present invention, the first and second material are pressed together via a positive fit.

In particular, the holding area and the collimation area form a positive fit at the pressing point. In particular, the contact surfaces of the holding area and the collimation area form the positive fit.

The inventors have recognized that a mechanically stable connection can be formed between the first and second material via the positive fit. The inventors have recognized that, herein, the positive fit can be formed in such a way that stresses between the first and second material can be absorbed by the positive fit.

According to one or more example embodiments of the present invention, the positive fit is formed in the manner of a hammer or in the manner of a peg.

In particular, the contact surface of the first material forms a positive form of the positive fit and the contact surface of the second material a negative form. Alternatively, the contact surface of the first material can form the negative form and the contact surface of the second material the positive form. In particular, the positive form and the negative form are formed in such a way that they can engage in one another with a positive fit.

"In the manner of a peg" means in particular that the positive form forms at least one cylinder-shaped or prism-shaped pin on the corresponding contact surface. In other words, the positive form of at least one pin is formed in the form of a cylinder or a straight prism on the contact surface. In other words, the pin forms a cross-sectional area of a circle or a prism, in particular a rectangle. In particular, the pin can be extended over the entire thickness of the fin. Herein, the at least one pin is in particular arranged perpendicularly on the corresponding contact surface. In particular, the other contact surface forms a corresponding recess formed to receive the pin as a negative form. The recess is formed in such a way that the pin can be pressed into the recess. In particular, the positive form can be formed by more than one pin. The negative form then forms a corresponding number of recesses. In some embodiments of the present invention, the negative form can form at least one pin and at least one recess and, correspondingly, the positive form at least one corresponding pin and at least one corresponding recess.

The positive fit formed in the manner of a hammer is formed analogously to the positive fit formed in the manner of a peg. In contrast to the positive fit in the manner of a peg, with the positive fit in the manner of a hammer, the at least one pin comprises a thickening at the end of the pin at the maximum distance from the corresponding contact surface. Herein, the corresponding recess is formed by a negative form of the pin.

In particular, during pressing together, the positive fit can be formed by "telescoping" the positive and the negative form parallel to the contact surfaces. In particular, the at least one pin is then extended in a direction over the complete contact surface of the pressing point. In particular, the at least one pin is then extended over the entire thickness of the fin. In particular, if the negative form and/or the positive form are formed by more than one pin, all pins are extended or formed in parallel over the complete contact surface.

In particular, the pin can have an extension of between 0.2 cm and 1.5 cm parallel to the height of the fin. In particular, the cylinder or the prism forming the pin can have a length of between 1 cm and 3 cm. Herein, the length of the pin is defined by how far the pin protrudes beyond the contact surface.

The inventors have recognized that a stable connection can be formed between the first and second material or between the holding area and the collimation area with a cylindrical or hammer-like positive fit. The inventors have in particular recognized that, in particular with a positive fit in the manner of a hammer, the thickening can prevent the holding area and the collimation area from "slipping apart".

According to a one or more example embodiments of the present invention, the fin comprises a guide element. Herein, the guide element is formed by the first and second material.

The guide element is in particular arranged on the side of the fin facing the radiation source. Alternatively or additionally, a further guide element can be arranged on the side of the fine facing away from the radiation source. The guide element is formed to stabilize the fin during adjustment with the adjustment device. In particular, the guide element prevents the fin from twisting or tilting relative to the beam direction. In particular, the fin is adjusted or moved further into the radiation field or beam path or further out of the radiation field or beam path along the guide element during adjustment of the collimation area.

In particular, the guide element can be formed to be guided in a guide system. Herein, the guide system comprises a counterpart to the guide element. The guide system can be stationary relative to the source of the therapeutic radiation.

In particular, the guide element can be formed as a guide rail or as a guide strip.

The guide element extends at least partially over the collimation area and at least partially over the holding area. In particular, the guide element is thus formed from the first and second material. In particular, the guide element can be formed by milling.

The inventors have recognized that the fin can be stabilized by the guide element during adjustment by the adjustment device. The inventors have also recognized that the guide element can be milled in after the pressing together. In this way, it can be ensured that the guide element does not warp as the result of a method step carried out later during the manufacture of the fin. The inventors have recognized that in this way the guide element can be formed over the pressing point.

One or more example embodiments of the present invention also relates to a collimator. The collimator comprises a plurality of fins as described above and an adjustment device. Herein, the fins are coupled with their holding areas to the adjustment device. Herein, the adjustment device is formed to adjust each fin of the plurality of fins perpendicular to a contact surface of the holding area and the collimation area.

The plurality of fins comprise at least two fins formed according to one of the above-described aspects. The plurality of fins are arranged next to one another in the collimator. In other words, the fins are arranged side surface to side surface. Herein, each of the fins is coupled to the adjustment device via its holding area. In particular, each fin can be adjusted in a plane parallel to its side surface with the adjustment device. In particular, each fin can be adjusted perpendicular to the contact surfaces of the holding area and the collimation area or perpendicular to the pressing point with the adjustment device.

A side surface of the fin is defined by the height of the fin and formed by the first and second material. In other words, the side surface extends over the holding area and the collimation area. Herein, a fin comprises two side surfaces. Herein, the two side surfaces of a fin are spaced apart by a distance corresponding to the thickness of the fin.

According to one or more example embodiments of the present invention, the collimator can comprise a guide system as described above. In particular, the guide system can be formed to guide the fins along their at least one guide element. In particular, the guide system is formed to prevent lateral tilting of the fins. In other words, the guide system stabilizes an alignment of the fins.

The inventors have recognized that a plurality of fins can be arranged in a collimator. The inventors have recognized that the radiation field can be restricted to the treatment area by adjusting the fins with the adjustment device. The inventors have recognized that the holding area does not have to be arranged in the beam path for this purpose. The inventors have recognized that for this reason the second material does not have to meet the requirement with regard to the attenuation of the therapeutic radiation. The inventors have recognized that the holding area only forms a mechanical coupling of the collimation area with the adjustment device.

One or more example embodiments of the present invention also relates to a method for manufacturing a fin as described above. The method comprises a method step of pressing together a first block made of the first material and a second block made of the second material to form a combination block.

The first and the second block are in particular cuboidal or crescent-shaped. During the pressing together of the first and second block, the pressing point is formed between the two blocks. Thus, the pressing point is formed by an at least approximately rectangular contact surface of the first block and an at least approximately rectangular contact surface of the second block. Herein, the combination block comprises the first and second block connected via the pressing point.

The first block and the second block have at least one thickness corresponding to the thickness of the fin. In other words, the first and/or second block are at least 0.5 mm to 10 mm, in particular at least 1 mm to 5 mm, thick. In particular, the first and second block can have a thickness of between 2 mm and 3 mm. The thickness of the blocks describes an extension parallel to the contact surfaces. The contact surfaces are thus extended at least 0.5 mm to 10 mm, in particular at least 1 mm to 5 mm, in one direction. In some embodiments, the contact surfaces can be extended at least 2 mm to 3 mm in one direction.

In particular, the at least approximately rectangular contact surfaces can be extended between 2 mm and 40 mm in one direction. In particular, the at least approximately rectangular contact surfaces can be extended between 20 mm and 80 mm in the direction perpendicular thereto. In particular, the contact surfaces of the first and second block can each comprise an area of approximately 64 mm×25 mm.

In particular, the first block can have an extension of between 100 mm and 180 mm in the direction perpendicular to the contact surface. In particular, the extension of the first block perpendicular to the contact surface can be approximately 140 mm.

In particular, the second block can have an extension of between 150 mm and 300 mm in the direction perpendicular to the contact surface. In particular, the extension of the second block perpendicular to the contact surface can be approximately 230 mm.

The inventors have recognized that the pressing together or forming of the pressing point takes place before the precise shaping of the fin based on two blocks. The inventors have recognized that a force exerted by the pressing together would deform an already precisely formed fin in such a way that the accuracy requirements would no longer be met. The inventors have recognized that this problem can be solved by pressing together the first and second material before the fin is shaped. The inventors have recognized that deformation during the pressing together of the blocks can still be compensated subsequently when the fin is shaped or cut out. The inventors have also recognized that cuboidal or crescent-shaped blocks are easy to handle during pressing together.

According to one or more example embodiments of the present invention, the method also comprises a method step of cutting out the fin from the combination block by wire erosion.

In particular, the fin is cut off or cut out from the combination block as a "slice". In particular, the "slice" is arranged in the combination block perpendicular to the pressing point. In particular, the side surfaces of the fin can be shaped during the cutting out. Herein, as described above, the side surfaces are the two surfaces of the fin which are formed by the first and second material and extend over the height of the fin. The side surfaces of the fin are aligned parallel to the beam direction during collimation of the therapeutic radiation.

In particular, a thickness of the fin can be formed variably along the height. In particular, hence, this allows cone beam geometry to be taken into account during the propagation of the therapeutic radiation. In particular, this variable thickness can be shaped when the fin is cut out by the shaping of the side surfaces. In particular, the shaping of the side surfaces enables the fin to be shaped in such a way that a cross-sectional area of a cross section through the collimation area parallel to the pressing point corresponds to a cross-sectional area of a truncated cone or a trapezoid. In particular, the thickness of the fin is then defined by a maximum and a minimum thickness.

In particular, more than one fin can be cut out of or cut off the combination block. In particular, two or more fins can be cut off the combination block in slices. Herein, in each case "a waste slice" can be cut off the combination block between the fins. In this way, the side surface of each fin can be formed or shaped by wire erosion.

The inventors have recognized that wire erosion enables the required accuracy to be achieved when the fin is cut out. The inventors have recognized that pressing together the first and second material before cutting out prevents the fin from being deformed by a subsequent application of force due to the joining or pressing together of the holding area and the collimation area. The inventors have recognized that a pressing point formed as described above is able to absorb any possible stresses caused by the temperature input between the two blocks or between the first and second material during wire erosion. The pressing point ensures a stable connection between the first and second material even during or after wire erosion.

According to one or more example embodiments of the present invention, the method also comprises a method step of milling out at least one side surface of the fin out from the combination block.

Herein, the side surface is formed as described above.

In particular, with this manufacturing method, the thickness of the combination block is equal to or only slightly greater than the thickness of the fin. The thickness of the combination block is dictated by the thickness of the first or second block. In particular, the thickness of the combination block can be equal to or 5% or 10% greater than the thickness of the fin.

In particular, the form of the side surfaces can be formed or shaped during milling. In particular, the shaping of the side surfaces can create a variable thickness of the fin over the height of the fin.

The inventors have recognized that the pressing point remains stable even when force is applied due to milling. In other words, the inventors have recognized that the pressing point also withstands the application of force due to milling.

According to one or more example embodiments of the present invention, the pressing together of the first and second block is performed hot isostatically. Herein, the method comprises a method step of applying a sintered material in powder form to a contact surface of the first and second block.

Herein, the sintered material is formed as described above. In particular, the sintered material is a third material, which forms a sintered layer between the first and second block after the pressing together. The contact surface or contact surfaces of the first and second block are formed as described above. In particular, the first and second block form the pressing point of the combination block at the contact surfaces.

Before pressing together, the sintered material is in powder form.

In particular, during hot isostatic pressing, the sintered material is "baked" with the first and second material. Herein, the sintered material is fused with the first and second material. Herein, the powder form increases a surface of the sintered material, thus facilitating fusion.

In particular, the sintered material can be applied to the contact surface of one of the two blocks. The other block can then be placed on the contact surface "coated" with the sintered material for pressing together.

The sintered material is in particular applied in such a way that, after the pressing together, it forms a sintered layer with a thickness of 10 mm-30 mm between the first and second block.

The inventors have recognized that the sintered material is easy to apply to the contact surface of one of the two blocks in powder form. The inventors have recognized that the sintered material enables a stable connection between the first and second block. The inventors have recognized that the sintered material can be formed such that it is able to absorb or compensate stresses between the first and second material, in particular due to temperature input during wire erosion. In particular, the sintered material is also able to absorb or compensate stresses due to temperature input when the fin is used as a collimator. The inventors have recognized that, for this purpose, after the pressing together, the sintered material advantageously forms a sintered layer of approximately 10 mm to 30 mm. The inventors have recognized that the sintered material can be selected in such a way that it forms a stable connection with the difficult-to-bond first material. The inventors have recognized that in this way a connection can be established between two materials that are normally difficult or not possible to connect (first and second material).

According to one or more example embodiments of the present invention, the pressing together takes place via a positive fit between the first and second block. Herein, the method also comprises a method step of cutting out a positive form of the positive fit from the contact surface of the first block and cutting out a negative form of the positive fit from a contact surface of the second block.

The positive fit is in particular formed as described above. The contact surfaces of the first and second block are in particular formed as described above. In particular, after the pressing together, the contact surfaces form the pressing point.

In an alternative embodiment, the positive form can be cut out of the contact surface of the second block and the negative form from the contact surface of the first block.

The wording "cutting out the negative form and the positive form" is used synonymously with the wording "cutting out the positive fit".

In particular, the positive form and the negative form can be cut out of the respective contact surfaces by wire erosion. In other words, cutting out the positive form and the negative form can comprise wire erosion of positive form and the negative form.

Alternatively or additionally, the positive form and the negative form can be milled out of the contact surfaces. In other words, cutting out the positive form and the negative form can comprise milling or milling out the positive form and the negative form. In particular, during milling, it is possible for the accuracy of the positive form and the negative form to be checked regularly in order to meet the accuracy requirement.

In particular, in the method step of pressing together, the first and second block are then pressed together via the positive fit. In other words, the positive form and the negative form are pressed into one another with a positive fit. In particular, during the pressing together, the blocks can be pushed into one another parallel to their contact surfaces.

The inventors have recognized that the positive fit as described above can be cut out of the contact surfaces of the first and second block by wire erosion and/or milling. In particular, the inventors have recognized that wire erosion enables the positive form or the negative form to be cut out more precisely than is the case with milling. The inventors have recognized that, in some embodiments of the present invention, the accuracy of the milling can be sufficient. The inventors have recognized that milling out the positive fit can be more cost-effective than wire erosion.

According to one or more example embodiments of the present invention, the method also comprises the method steps of milling out at least one guide element from the combination block and/or milling out a contour of the holding area from the combination block.

Herein, the guide strip is formed as described above. Herein, the guide strip can be milled out before the fin is cut out from the combination block. Alternatively, the guide strip can be milled out after the fin is cut out from the combination block.

The contour of the holding area describes a manifestation of the edges of the holding area that is not in contact with the collimation area. In particular, the contour describes a contour of the side surface of the fin in the holding area.

In particular, the contour is formed in such a way that the holding area can be coupled to the adjustment device. In particular, the contour of the holding area can form a bar with which the holding area can be coupled to the adjustment device.

In particular, the contour can be formed in such a way that the holding area is as weight-saving as possible. In particular, the holding area can comprise cut-outs in the area of the side surface of the fin formed by the holding area. In other words, the contour can comprise at least one cut-out.

In particular, the method step of milling out the contour of the holding area can be executed before the fin or the side surface of the fin is cut or milled out from the combination block. Alternatively, the method step of the milling out of the contour of the holding area can take place after the fin or the side surface of the fin is cut or milled out from the combination block. Alternatively, the contour of the holding area can take place partially before and partially after the fin is cut out from the combination block.

The inventors have recognized that milling out the guide element and/or the contour of the holding area before the fin is cut out from the combination block can prevent warping or deformation of the fin.

FIG. 1 shows a first exemplary embodiment of a fin 1 for collimating therapeutic radiation.

The fin 1 comprises a holding area 12 and a collimation area 11. The holding area 12 and the collimation area 11 are connected to one another via a pressing point 13. In other words, the holding area 12 and the collimation area 11 are pressed together.

The fin 1 can in be arranged in a therapeutic radiation beam path for radiotherapy. Herein, in an advantageous embodiment of the present invention, the therapeutic radiation can be X-radiation. In alternative embodiments, the therapeutic radiation can be particle radiation. Herein, the beam path describes the propagation of the therapeutic radiation. The beam path delimits a radiation field. Herein, the radiation field describes an area in a plane in which the therapeutic radiation propagates or onto which the therapeutic radiation is irradiated. In radiotherapy, a treatment area of an examination object is irradiated with the therapeutic radiation. Radiotherapy with X-radiation as therapeutic radiation typically uses ultra-hard X-radiation (>1 MeV). In particular, X-radiation with energy greater than or equal to 6 MeV can be used. In order to ensure that only the treatment area is irradiated with the therapeutic radiation, the radiation field is restricted by collimation of therapeutic radiation with at least one fin 1. In particular, herein, the fin 1 can be arranged in a collimator 2 as part of a plurality of fins 1, as depicted in FIG. 4. In the depicted alignment of the fin 1, a source of the therapeutic radiation, in particular an X-ray source, is arranged above the fin 1. The examination object is arranged below the fin 1. The therapeutic radiation penetrates the fin 1 parallel to its height. In the depicted alignment, the therapeutic radiation penetrates the fin 1 from top to bottom. FIG. 1 shows a top view of a side surface of the fin 1. Herein, a thickness of the fin 1 describes an extension of the fin 1 into the image plane. The fin 1 can have a thickness of between 0.5 mm and 10 mm. In particular, the fin 1 can have a thickness of between 1 mm and 5 mm. In particular, the fin 1 can have a thickness of between 2 mm and 3 mm. In particular, the thickness of the fin 1 can vary over the height. In particular, the fin 1 can be thinner at a top edge of the side surface than at a bottom edge. Herein, "top" and "bottom" refer to the depiction according to FIG. 1. In other words, a cross section perpendicular to the image plane through the fin 1 can be a cross section of a truncated cone or a trapezoid. In particular, the thickness of the fin 1 is then defined by a maximum and a minimum thickness.

The collimation area 11 is made of a first material. Herein, the first material is formed to collimate therapeutic radiation, in particular X-radiation. In other words, the first material is formed to attenuate the intensity of the therapeutic radiation in such a way that the intensity of the therapeutic radiation is negligible after penetrating the collimation area 11. In particular, if the therapeutic radiation is X-radiation, the intensity of the X-radiation can be attenuated to at most 2% of the incident intensity by the penetration of the fin 1. In some embodiments of the present invention, the intensity of the X-radiation can be attenuated to at most 1% of the incident intensity by the penetration of the fin 1.

In some embodiments of the present invention, the first material can in particular be tungsten or a compound comprising tungsten or tungsten compound. Herein, the compound comprising tungsten comprises a tungsten content of at least 90%. Herein, the compound comprising tungsten in particular comprises a tungsten content of at least 95%. The compound comprising tungsten also comprises a binder or a matrix. The binder can in particular be iron-nickel or copper-nickel.

The holding area 12 is formed so it can be coupled to an adjustment device. In particular, the holding area 12 can be coupled to the adjustment device by a bar 121. Herein, the bar 121 can be formed at any height of the fin 1. In particular, in the case of different fins 1 in a collimator 2 according to FIG. 4, the bar 121 can be formed at different heights to enable easy or simple adjustment. In particular, in this way, this can prevent the fins 1 in the collimator 2 interfering with each other during adjustment with the adjustment device. The holding area 12 can comprise at least one cut-out 122. The cut-out 122 can reduce the weight of the holding area 12. In particular, the weight can be reduced without impairing the stability of the holding area 12. In particular, a contour of the holding area 12 can be defined by the bar 121 and/or the at least one cut-out 122. The holding area 12 is made of a second material. In some embodiments of the present invention, the second material can in particular comprise at least one of the following materials: a copper-nickel compound, brass, steel, stainless steel, titanium, bronze, an aluminum alloy.

In some embodiments of the present invention, the first and second material can be paramagnetic. In particular, the magnetic permeability of the first and second material is then less than 1.05 µ0. In particular, the binder of the collimation area 11 can then be copper-nickel.

In some embodiments of the present invention, the first and/or second material can meet at least one of the following criteria: radiation resistance (in particular to approximately 250 kGy), operating temperature at least between 15 and 50° C., suitability for wire erosion (in particular resistivity of less than 100 Ωcm), hardness of at least 50 HV (in particular at least 70 HV or 75 HV), machinability, high corrosion resistance. In particular, the first and/or second material can meet all these criteria.

The collimation area 11 and the holding area 12 or the first and second material are pressed together or connected to one another. In particular, a contact surface of the collimation area 11 is pressed together with a contact surface of the holding area 12. In particular, the collimation area 11 and the holding area 12 are pressed together at the pressing point 13.

In the exemplary embodiment depicted, the first and second material or the collimation area 11 and the holding area 12 are hot isostatically pressed together. In particular, during hot isostatic pressing, the first and second material are pressed together at a temperature of up to 2000° C. and a pressure of between 100 MPa and 200 MPa. In particular, the first and second material are pressed together at a temperature of between 900° C. and 1200° C.

In some embodiments of the present invention, a sintered material can be arranged between the first and second material at the pressing point 13. Herein, the sintered material is formed to form a connection between the first and second material during hot isostatic pressing. Herein, the sintered material is "baked" with the first and second material after hot isostatic pressing. The sintered material can in particular form a sintered layer with a thickness of 10 mm to 30 mm between the first and second material. Herein, the sintered material is a third material.

In some embodiments of the present invention, the sintered material is made of nickel or nickel-tungsten. In particular, the sintered material comprises at least one component of the first material. In particular, a particularly stable connection can then be formed between the sintered material and the first material.

In some embodiments of the present invention, the fin 1 can comprise at least one guide element 15. The guide element 15 can be arranged at the top edge or at the bottom edge of the fin 1 or the side surface of the fin 1. In particular, one guide element 15 can be arranged at the top edge and one guide element 15 at the bottom edge of the side surface. The at least one guide element 15 can be a guide strip or a guide rail. The guide element 15 is formed to prevent tilting of the fin 1 during adjustment of the fin 1 with the adjustment device. In particular, the fin 1 can be adjusted along the at least one guide element 15. Herein, the guide element 15 is formed by the first and second material. In other words, the at least one guide element 15 extends at least partially over the holding area 12 and at least partially over the collimation area 11. In particular, the at least one guide element 15 can be milled into the first and second material. In other words, the guide element 15 can be milled out of the first and the second material.

FIG. 2 shows a second exemplary embodiment of a fin 1 for collimating therapeutic radiation.

The fin 1 is formed analogously to the fin according to FIG. 1. Alternatively or additionally to the pressing point 13 according to FIG. 1, the pressing point 13 according to FIG. 2 forms a positive fit 14'. In other words, the first and second material or the collimation area 11 and the holding area 12 are connected to one another or pressed together via a positive fit 14'. Herein, the collimation area 11 forms a positive form of the positive fit 14' and the holding area 12 a negative form of the positive fit. Alternatively, the collimation area 11 can form the negative form and the holding area 12 the positive form. Herein, the negative form and the positive form are pressed together with a positive fit.

In the exemplary embodiment depicted, the positive fit 14' is formed in the manner of a peg. In particular, the positive form forms prism-shaped pins that are pressed together with corresponding recesses in the negative form.

FIG. 3 shows a third exemplary embodiment of a fin 1 for collimating therapeutic radiation.

The depicted exemplary embodiment is formed analogously to the exemplary embodiment according to FIG. 2.

Alternatively to the exemplary embodiment according to FIG. 2, the positive fit 14" is formed in the manner of a hammer. In particular, herein, the pins of the positive fit 14" form a thickening at an end spaced apart from the corresponding contact surface. Herein, the positive fit 14" can be formed by lateral telescoping of the positive form and the negative form when the first and second material are pressed together S1.

FIG. 4 shows an exemplary embodiment of a collimator 2.

The collimator 2 comprises a plurality of fins 1. In the exemplary embodiment depicted, the collimator 2 comprises fins 1 formed according to the third exemplary embodiment. Alternatively, the collimator 1 can also comprise other embodiments of the fin 1 according to the present invention. Each of the fins 1 is coupled by a bar 121 to an adjustment device. Herein, the fins 1 can be adjusted according to the direction depicted by the double arrow. Herein, the bars 121 of the different fins 1 are arranged at different heights on the corresponding fin 1. In particular, the adjustment of the fins 1 can be simplified in this way. In particular, in this way, this can prevent the fins 1 interfering with each other during adjustment.

The collimator 2 also comprises a guide system 21. The fins 1 can be stabilized with the guide system 21 during adjustment. In particular, herein, the fins 1 are guided along their guide elements 15 in the guide system 21. In particular, lateral tilting of the fins can be prevented in this way.

FIG. 5 shows an exemplary embodiment of a method for manufacturing a fin 1 for collimating therapeutic radiation.

In particular, this depicts a method for manufacturing a fin 1 according to the exemplary embodiments 1 to 3.

The method steps depicted in dashed lines are optional method steps which may be comprised by the method in dependence on the properties of the fin 1 manufactured.

The method comprises a method step of a pressing together S1 a first block made of the first material and a second block made of the second material. Herein, the blocks are pressed together or connected to one another to form a combination block.

During the pressing together S1, the pressing point 13 is formed between the first and second block. Herein, the first and second block are in particular cuboidal or crescent-shaped. Herein, each of the blocks has a thickness corresponding at least to the (maximum) thickness of the fin 1.

During the pressing together S1, in each case a contact surface of the first block is pressed together with a contact surface of the second block. Herein, the contact surfaces can be formed as rectangular. In particular, the rectangular contact surfaces can be extended between 2 mm and 40 mm in one direction. In particular, the rectangular contact surfaces can be extended between 20 mm and 80 mm in the direction perpendicular thereto. In particular, the contact surfaces can in each case comprise an area of approximately 64 mm×25 mm.

In particular, the first block can have an extension of between 100 mm and 180 mm in the direction perpendicular to the contact surface. In particular, the extension of the first block perpendicular to the contact surface can be approximately 140 mm.

In particular, the second block can have an extension of between 150 mm and 300 mm in the direction perpendicular to the contact surface. In particular, the extension of the second block perpendicular to the contact surface can be approximately 230 mm.

The method comprises an optional method step of cutting out S2*a* the fin 1 from the combination block by wire erosion.

In particular, the side surfaces of the fin 1 are shaped during the cutting-out S2*a* of the fin 1 from the combination block by wire erosion.

In some embodiments of the present invention, more than one fin 1 can be cut out from the combination block in the method step of cutting out S2*a*.

Alternatively to the method step of cutting out S2*a* the fin 1 by wire erosion, the method can optionally comprise a method step of milling out S2*b* at least one side surface of the fin 1 from the combination block.

In particular, in the method step, both side surfaces of the fin 1 can be milled out from the combination block. In other words, the side surface of the fin 1 can be shaped during milling-out S2*b* of the side surface. In particular, the wording "the side surface is milled out from the combination block" is synonymous with the wording "the fin 1 is milled out from the combination block". In particular, the thickness of the combination block corresponds to the (maximum) thickness of the fin 1. Alternatively, the combination block is only slightly, in particular at most 10%, thicker than the fin.

In an optional method step of milling out S5 at least one guide element 15, the at least one guide element 15 can be milled out before the cutting-out S2a or milling-out S2b of the fin 1 from the combination block. In particular, the at least one guide element 15 is milled out parallel to the side surface of the fin 1. Herein, the at least one guide element 15 is formed as in the description of FIGS. 1 and 4.

Alternatively, the method step of milling out S5 the at least one guide element 15 can be executed after the optional method step of milling out S2b at least one side surface of the fin 1.

The method also comprises an optional method step of milling out S6 a contour of the holding area 12 from the combination block.

In particular, herein, the bar 121 and the at least one cut-out 122 of the holding area 12 are milled out. Thus, in particular, the contour of the holding area 12 in the area of the combination block is formed by the second material. The method step of milling out S6 the contour of the holding area 12 can be executed before or after the milling-out S5 of the at least one guide element 15.

In particular, the method step of milling out S6 the contour of the holding area 12 can be executed before cutting out S2a the fin or milling out S2b the at least one side surface of the fin 1. Alternatively, the contour of the holding area 12 can be milled out of the fin 1 that has already been cut off or milled out. In other words, the method step of milling out S6 the contour of the holding area 12 can be executed after the method step of cutting out S2a the fin or milling out S2b the at least one side surface of the fin 1. Alternatively, the method step of milling out S6 the contour of the holding area 12 can be executed partially before and partially after the method step of cutting out S2a the fin or of milling out S2b the at least one side surface of the fin 1. For example, the bar 121 can be milled out beforehand and the at least one cut-out 122 afterward.

The method comprises a further optional method step of applying S3 a sintered material to a contact surface of one of the two blocks. The method step of applying S3 the sintered material is in particular executed when the method step of pressing together S1 comprises hot isostatic pressing. Herein, the sintered material and the contact surfaces are formed as in the description for FIG. 1. In hot isostatic pressing, the first and second block are pressed onto one another at the contact surfaces at a temperature of up to 2000° C. and a pressure of between 100 MPa and 200 MPa. In particular, the first and second block are pressed together at a temperature of between 900° C. and 1200° C. In particular, herein, the combination block is produced. Herein, the sintered material is applied between the contact surfaces. In the case of hot isostatic pressing, the sintered material melts and thus forms a connection between the first and second block. After hot isostatic pressing, the sintered material forms a sintered layer with a thickness of between 10 mm and 30 mm between the first and second block. In particular, during the pressing together S1, the first and second block and the sintered material can be arranged in a container, in particular in a steel container. In particular, the container can be compressed by exerting a pressure of between 100 MPa and 200 MPa. In particular, after the pressing together S1, the container can be removed from the combination block. The pressure can in particular be exerted under argon atmosphere. In particular, the pressure can be exerted by compressing argon to form a superfluid.

The method also comprises the optional method steps of cutting out S4.1 a positive form of a positive fit 14', 14" from the contact surface of the first block and of cutting out S4.2 a negative form of the positive fit 14', 14" from the contact surface of the second block. These method steps are executed when pressing together S1 comprises pressing together the first and second block via a positive fit 14', 14".

Alternatively, the negative form can be cut out of the contact surface of the first block and the positive form out of the contact surface of the second block.

Herein, the positive fit 14' 14" is formed according to the description for FIGS. 2 and 3. In particular, the positive fit is formed 14', 14" in the manner of a peg or in the manner of a hammer.

During cutting-out S4.1, S4.2 of the positive form and the negative form, the positive form and the negative form can be cut out of the corresponding contact surfaces of the first or second block by wire erosion.

Alternatively, during cutting-out S4.1, S4.2 of the positive form and the negative form, the positive form and the negative form can be milled out of the corresponding contact surfaces of the first or second block.

Although some example embodiments of the present invention have been disclosed in the form of preferred embodiments and variations thereon, it will be understood that numerous additional modifications and variations could be made thereto without departing from the scope of example embodiments of the present invention. For the sake of clarity, it is to be understood that the use of "a" or "an" throughout this application does not exclude a plurality, and "comprising" does not exclude other steps or elements. The mention of a "unit", "module" or a "device" does not preclude the use of more than one unit or device.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

Where not explicitly done, but useful and in the spirit of the present invention, individual exemplary embodiments, individual aspects thereof or features can be combined or interchanged without departing from the scope of the present invention. Where transferrable, advantages described with respect to an exemplary embodiment also apply to other embodiments without explicit mention.

The invention claimed is:

1. A fin for collimating therapeutic radiation comprising:
a collimation area including a first material, the collimation area having a first external edge, a second external edge facing the first external edge, a third external edge connected to the first external edge and the second external edge, and a fourth external edge, a second external edge facing the first external edge, a third external edge and connected to the first external edge and the second external edge; and
a holding area including a second material,
wherein the collimation area and the holding area are hot isostatically pressed together,
wherein the collimation area is joined to the holding area only along the first external edge,
wherein the first material is configured to collimate therapeutic radiation, and
wherein the holding area is configured to adjust the fin.

2. The fin as claimed in claim 1, wherein the first material and the second material are paramagnetic.

3. The fin as claimed in claim 2, wherein the first material is tungsten or a compound comprising tungsten.

4. The fin as claimed in claim 1, wherein the first material is tungsten or a compound comprising tungsten.

5. The fin as claimed in claim 4, wherein the second material comprises at least one of: a copper-nickel compound, brass, titanium, steel, stainless steel, bronze, or an aluminum alloy.

6. The fin as claimed in claim 4, wherein the second material comprises at least one of: a copper-nickel compound, brass, titanium, bronze, or an aluminum alloy.

7. The fin as claimed in claim 1, wherein the second material comprises at least one of: a copper-nickel compound, brass, titanium, steel, stainless steel, bronze, or an aluminum alloy.

8. The fin as claimed in claim 1, wherein
a sintered material is between the first material and the second material, and
the sintered material is configured to form a connection between the first and second material during hot isostatic pressing.

9. The fin as claimed in claim 8, wherein the sintered material is formed from nickel or nickel-tungsten.

10. The fin as claimed in claim 1, wherein the first material and the second material are pressed together via a positive fit.

11. The fin as claimed in claim 10, wherein the positive fit is formed as a peg or as a hammer.

12. The fin as claimed in claim 1, further comprising:
a guide element, wherein the guide element is formed by the first and second material.

13. A method for manufacturing the fin as claimed in claim 1, the method comprising:
pressing together a first block made of the first material and a second block made of the second material, along only a first external edge of the first block corresponding with the first external edge of the collimation area, to form a combination block.

14. The method as claimed in claim 13, further comprising:
cutting out the fin from the combination block by wire erosion.

15. The method as claimed in claim 13, further comprising:
milling out at least one side surface of the fin from the combination block.

16. The method as claimed in claim 13, wherein the pressing together of the first block and the second block is performed hot isostatically, and the method further comprises:
applying a sintered material in powder form to a contact surface of the first block and the second block.

17. The method as claimed in claim 13, wherein the pressing together takes place via a positive fit between the first block and the second block, the method further comprising:
cutting out a positive form of the positive fit from a contact surface of the first block; and
cutting out a negative form of the positive fit from a contact surface of the second block.

18. The method as claimed in claim 13, further comprising:
at least one of
(i) milling out at least one guide element from the combination block, or
(ii) milling out a contour of the holding area from the combination block.

19. A collimator comprising:
a plurality of fins, each of the plurality of fins including,
a collimation area including a first material, the collimation area having a first external edge a second external edge facing the first external edge, a third external edge connected to the first external edge and the second external edge, and a fourth external edge facing the third external edge and connected to the first external edge and the second external edge, and
a holding area including a second material,
wherein the collimation area and the holding area are hot isostatically pressed together,
wherein the collimation area is joined to the holding area only along the first external edge,
wherein the first material is configured to collimate therapeutic radiation,
wherein the holding area is configured to adjust the fin, and
wherein the plurality of fins are configured to be adjusted perpendicular to a contact surface of the holding area and the collimation area.

* * * * *